Patented Dec. 7, 1943

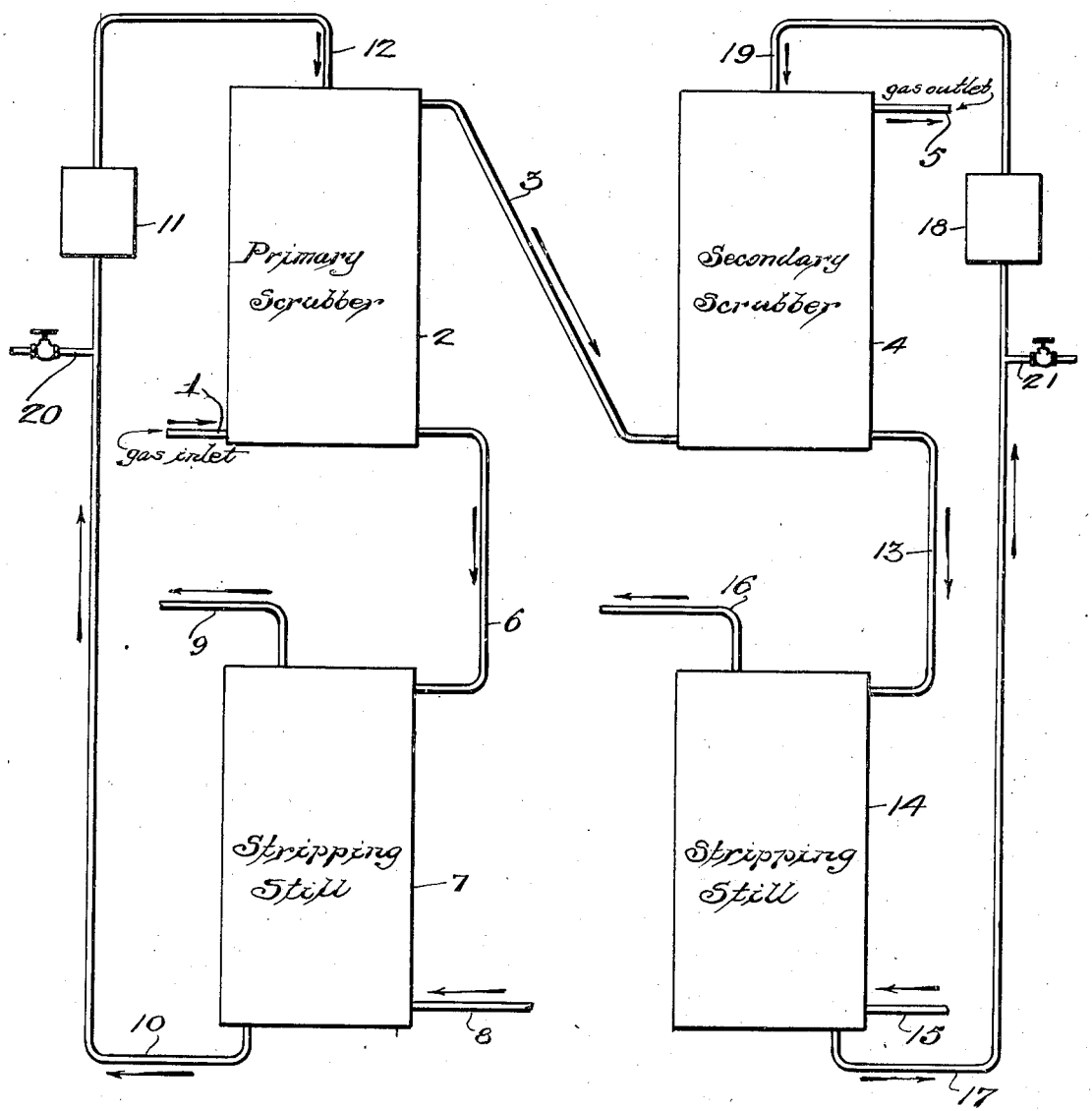

2,335,855

UNITED STATES PATENT OFFICE 2,335,855

RECOVERY OF VALUABLE HYDROCARBONS

Edwin L. Hall, Philadelphia, Pa., assignor to The United Gas Improvement Company, a corporation of Pennsylvania Application October 26, 1939, Serial No. 301,329

3 Claims. (Cl. 196—8)

This invention pertains generally to the recovery of valuable hydrocarbons from gas mixtures containing them.

The invention pertains more particularly to the recovery of such hydrocarbons from a manufactured gas obtained by the pyrolytic decomposition of hydrocarbon oil with or without the aid of catalysts.

Various processes for the manufacture of artificial gases such as carburetted water gas and oil gas wherein a petroleum oil is decomposed pyrolytically or catalytically (or both) result in gas mixtures which contain difficultly condensible gaseous decomposition products such as methane, ethane, ethylene, propylene, etc., as well as some hydrogen. There are also present the vapors of more easily condensible hydrocarbon substances which may be more or less readily separated from the gas mixtures. These latter substances comprise a source of valuable hydrocarbons and particularly those of the resin-forming unsaturated type such as styrene, indene, methyl styrene, cyclopentadiene, isobutylene, isoprene, piperylene, butadiene, etc.

To remove light oils from manufactured gases one may use an absorbent oil as a scrubbing medium. The absorbent oil (also designated as "wash oil") may be for instance a petroleum distillate boiling in the range of about 400° to 700° F., i. e., about 205° to 370° C. The amount of such an oil required is proportional to its molecular weight. In some cases it has been found that in addition to suffering from the disadvantage that a greater quantity is required than of low molecular weight oils, the hydrocarbons that are being removed may become associated with the high molecular weight absorbent oil in such a manner as to render their subsequent removal extremely difficult.

It has been proposed to use low molecular weight absorbent substances as the scrubbing medium but a common objection to the use of such materials is that they possess relatively high vapor pressures and consequently the losses of the scrubbing medium in the gas may tend to be excessive.

An object of my invention is the provision of a system for removing valuable relatively volatile hydrocarbons (which may include the $C_4$ and $C_5$ unsaturated hydrocarbons) from gas mixtures such as those from the source indicated, without objectionable loss of scrubbing medium yet with good recovery of the major portion of the valuable hydrocarbon constituents of the gas.

Another object is to effect such a recovery in a system which is simple in arrangement and operation.

With these and other objects in view my invention is based in part upon a two-stage scrubbing system in which a relatively low molecular weight and consequently relatively volatile scrubbing medium is used in the first stage to remove more volatile compounds such as benzene, $C_4$ and $C_5$ hydrocarbons from the gas and a higher molecular weight and consequently less volatile scrubbing medium is used in a second stage to remove vapors of the relatively more volatile scrubbing medium from the residual gas.

I have found that my two-stage system may be made very effective by the use of toluene substantially free from benzene as the relatively low molecular weight scrubbing medium in the first stage and a relatively high molecular weight scrubbing medium such as absorbent oil in the second stage. I find that the principal objections to the use of either of these two scrubbing media individually, namely (1) loss of low molecular weight scrubbing medium due to the relatively high vapor pressures thereof, even at considerably lowered temperatures, (2) relatively large quantities of high molecular weight absorbing medium required, (3) difficulty in recovering polymerizable hydrocarbon constituents associated with the high molecular weight absorbing medium, (4) relatively high stripping temperatures required with high molecular weight absorbing medium, are substantially completely eliminated by my invention.

The invention may be further described in greater detail in connection with the accompanying drawing, which illustrates one preferred embodiment thereof. Other ways of practicing my invention will suggest themselves to those skilled in the art upon becoming familiar with the description herein.

Gas manufactured in any suitable gas-making equipment (not shown) such as by a process involving the decomposition of hydrocarbon oil may be passed through conventional or other condensing equipment (not shown) as is customary in the art, in which substantial quantities of tar are separated and removed from the gas. By reducing the temperature of the gas to say just above 0° C., the separation of substances such as indene, methyl styrene, styrene, and xylene is substantially complete, and only a small part of the toluene and a somewhat larger part of the benzene remain. On the other hand, substantially all of the hydrocarbons of five carbon atoms (called $C_5$ hydrocarbons) and of four carbon atoms (called C₄ hydrocarbons) remain in the gas.

To recover the rest of the benzene and substantial quantities of the C₄ and C₅ hydrocarbons, the gas may then be introduced by pipe 1 into a scrubbing tower 2 such as at the bottom, in which tower it is contacted countercurrently with liquid toluene substantially free from benzene which may be introduced at or near the top of the tower such as through pipe 12.

The toluene is contacted with the gas in a manner and under conditions capable of removing substantially all the benzene and substantial quantities of the valuable C₄ and C₅ hydrocarbons from the gas, the degree of removal being dependent upon the proportion of scrubbing medium to gas and the temperature at which scrubbing takes place.

The gas leaves tower 2 by way of conduit 3. Due to the relatively high volatility of toluene this gas will contain vapors thereof in an amount which, while not great relatively at the temperatures usually employed in tower 2, represents in the aggregate a very substantial loss of valuable toluene.

To recover this toluene, the gas may be introduced by means of conduit 3 into a second scrubbing tower 4 such as at the bottom. In this tower the gas containing vapors of the toluene is contacted with a relatively less volatile scrubbing medium illustrated for convenience as introduced at or near the top. As an example, an absorbent oil comprising a petroleum oil fraction of the characteristics already mentioned such as straw-oil may be employed as the scrubbing medium in this secondary scrubbing stage.

The relatively less volatile liquid scrubbing medium removes substantially all the vapors of the relatively more volatile toluene from the gas which, as illustrated, exits from the tower 4 by way of conduit 5. The residual gas may then be passed if desired to further processing equipment and then to storage for use as fuel, or it may be treated or used in any other desired manner.

Returning to the primary scrubbing tower 2 where the gas is initially treated according to my invention, the liquid toluene containing benzene and C₄ and C₅ hydrocarbons absorbed from the gas exits from the base of the tower through a suitably trapped conduit 6 and may be then introduced into a recovery and regenerating zone wherein the absorbed materials are separated and recovered and the liquid toluene thus regenerated for reuse on fresh quantities of gas.

Such a recovery and regenerating zone may for instance comprise any convenient type of stripping still 7 into which the rich toluene may be introduced and subjected to heat to effect the desired separation based upon differences in boiling points, in a well-known manner. If desired, and when expedient, steam or other vapor or gas may be introduced as by pipe 8 as a stripping medium to assist the separation. The vapors of the desired valuable hydrocarbons (together with the stripping medium if used, and some vapors of toluene—depending upon the sharpness of the separation obtainable in the stripping still) leave the stripping zone by way of pipe 9 which conducts them to equipment (not shown) for further separation and treatment.

The lean toluene from which the valuable hydrocarbons have been removed may leave the stripping zone by pipe 10 and flows through cooler 11 to inlet pipe 12, which in turn introduces it into the primary scrubbing tower 2 for treatment of fresh quantities of gas.

The circuit for the relatively less volatile scrubbing medium may be, in general, similar to that for the toluene.

Thus, the less volatile scrubbing medium containing toluene scrubbed from the gas may leave the secondary scrubbing tower 4 by means of a suitably trapped pipe 13 which conducts it to a recovery and regenerating zone wherein the absorbed toluene is separated and the less volatile scrubbing medium is regenerated for reuse on fresh quantities of gas.

Such a recovery and regenerating zone may for instance be represented by any type of stripping still 14 into which the rich straw-oil may be introduced and subjected to heat in order to separate the lower boiling constituents therefrom by reason of differences in boiling points. It may be desirable to introduce steam as by pipe 15 to assist the separation. The vapors of toluene and some vapors from the less volatile scrubbing medium (together with water vapor, if steam is used), depending upon the sharpness of the separation obtained, leave the stripping zone by way of pipe 16 which then conducts them to equipment (not shown) for further separation and treatment.

The lean scrubbing medium from which toluene has been removed may leave the stripping still 14 by way of pipe 17 which returns it through a cooler 18 to inlet 19, which serves to introduce it into the secondary scrubber 4 for treatment of fresh quantities of gas.

It will thus be seen that I attain the objects of my invention by the use of a simple and flexible system involving two stages of scrubbing. Relatively efficient absorption ratios are obtained, since the more volatile toluene is a more efficient scrubbing medium than the less volatile petroleum oil fraction in about the inverse ratio of their molecular weights. In one particular instance using toluene and straw-oil, this inverse ratio is about 3 to 1. Hence, the bulk of the absorption work is done with a highly efficient scrubbing medium.

My system permits of recovery of valuable hydrocarbons of the type indicated from gas with lowered polymerization losses—since substantially all of the polymerizable hydrocarbon bodies except possibly a small portion of butadiene—depending upon the type of operation—may be picked up in the primary scrubber by the toluene from which the low boiling hydrocarbons, such as C₅'s, may be removed in a stripping zone at relatively low temperatures—that is, low relative to the temperatures that would be required if a less volatile scrubbing medium than toluene were to be employed. Gradual accumulations of high boiling resin formers such as styrene, indene, dicyclopentadiene, etc., which accumulate in the toluene in the primary stripping zone scrubbing circuit may be periodically removed as bottoms from the stripping still 7 by sending the toluene overhead. This may be accomplished at relatively low temperatures and with low reflux ratios, and if desired at reduced pressures to avoid polymerizing the bottoms.

The quantities of residual butadiene (C₄ hydrocarbon) and of residual C₅ hydrocarbons recovered from the gas by the relatively less volatile petroleum oil in the secondary scrubbing stage are usually too small to present any serious polymerization problem in the second stage scrubbing and regenerating equipment. No appreciable amounts of high boiling polymerizable bodies such as styrene, indene and dicyclopentadiene accumulate in the scrubbing oil and high stripping temperatures are not required.

For the sake of simplicity, conventional apparatus elements such as necessary valves, pumps, meters, etc., have not been shown.

The scrubbing towers 2 and 4 may be of any desired construction and operation for effecting gas-liquid contact such as packed towers, unpacked towers, bubble-cap and plate towers, sieve-plate tower, or the like.

The separators 7 and 14 may be any suitable construction and operation such as stills equipped with fractionating columns, if desired, and heated in any desired manner.

If preferred, one or both of separators 7 and 14 may be operated under partial vacuum thus permitting the stripping step to take place at correspondingly lower temperatures.

Coolers 11 and 18 may be of any suitable type, such as affords indirect heat-exchange with any suitable cooling medium. It may be preferred to maintain the recirculated scrubbing media entering the scrubbing towers 2 and 4 at 12 and 19 (respectively) at temperature at, or slightly above, the temperatures of the gas streams entering the respective towers in order to prevent condensation of any water vapor contained in the gas which might adversely affect the scrubbing action by forming emulsions with condensible hydrocarbons.

Additional heat-exchange may be arranged between the flowing fluid streams in any desired manner to bring about greater heat economies; as one instance, the liquid flowing in lines 6 and 13 might be passed through suitable heat-exchangers with the steam blowing in lines 8 and 15 respectively.

The vaporous products leaving the stripping zones by means of conduits 9 and 16 may be separated and refined in any apparatus suited to the purpose.

Make-up scrubbing media may be introduced into the system as shown at 20 and 21.

Other scrubbing media might be substituted for straw-oil such as other petroleum fractions or other absorbent oils of relatively low volatility.

It will be understood that the foregoing is by way of illustration and that changes, omissions, additions, substitutions, and/or modifications might be made within the scope of the claims without departing from the spirit of the invention.

I claim:

1. A method for separating relatively volatile hydrocarbons from manufactured gas, which comprises cooling said gas to a temperature sufficiently low to effect the condensation of at least the major portion of benzene hydrocarbons present, and including the condensation of at least the major portion of the benzene; separating condensed material from the gas; contacting the gas in a primary scrubbing zone with liquid toluene as scrubbing medium to scrub out relatively volatile hydrocarbons by absorption in said toluene; withdrawing from said primary scrubbing zone the scrubbed gas mixture containing vapors of toluene taken up by the gas from said scrubbing medium; contacting the scrubbed gas mixture in a secondary scrubbing zone with a second liquid scrubbing medium relatively less volatile than said toluene to scrub out toluene vapors from said gas mixture by absorption thereof in said second liquid scrubbing medium; withdrawing from said second scrubbing zone the residual gas mixture and the said relatively less volatile scrubbing medium containing toluene absorbed therein; and withdrawing from said primary scrubbing zone liquid toluene containing relatively volatile hydrocarbons absorbed therein.

2. A method for separating relatively volatile hydrocarbons from a manufactured gas obtained by a process involving the pyrolytic decomposition of petroleum oil, which comprises contacting said gas in a primary scrubbing zone at a temperature not higher than about 0° C. with liquid toluene to remove relatively volatile hydrocarbons by absorption in said toluene; passing the scrubbed gas mixture containing toluene vapor taken up from said liquid toluene into a secondary scrubbing zone; contacting said scrubbed gas mixture in said secondary scrubbing zone with an absorbent oil relatively less volatile than said toluene to scrub out toluene from the gas mixture; withdrawing from said secondary scrubbing zone the residual gas mixture and the absorbent oil containing toluene absorbed therein; and withdrawing from said primary scrubbing zone liquid toluene containing relatively volatile hydrocarbons absorbed therein.

3. A method for continuously separating $C_4$ and $C_5$ hydrocarbons from a gas mixture resulting from a process involving the pyrolytic decomposition of petroleum oil, which comprises contacting said gas mixture in a first scrubbing zone at a temperature not higher than about 0° C. with liquid toluene to remove $C_4$ and $C_5$ hydrocarbons from said gas mixture by absorption in said toluene; withdrawing from said first scrubbing zone the scrubbed gas mixture containing toluene vapor taken up from said liquid toluene; contacting said scrubbed gas mixture in a second scrubbing zone with a petroleum oil fraction having a boiling range of about 205° to 370° C. to remove toluene vapor from said gas mixture by absorption in said petroleum oil fraction; withdrawing the residual gas mixture from said second scrubbing zone; withdrawing from each of said scrubbing zones the respective liquid absorption media containing hydrocarbon constituents absorbed therein; and passing said liquid absorption media to separate stripping zones and heating said liquid absorption media to separate absorbed constituents therefrom with simultaneous regeneration of said liquid absorption media; and returning the regenerated absorption media respectively to said scrubbing zones.

EDWIN L. HALL.